E. PIERI.
CAMERA ATTACHMENT.
APPLICATION FILED APR. 10, 1920.
1,354,999.
Patented Oct. 5, 1920.
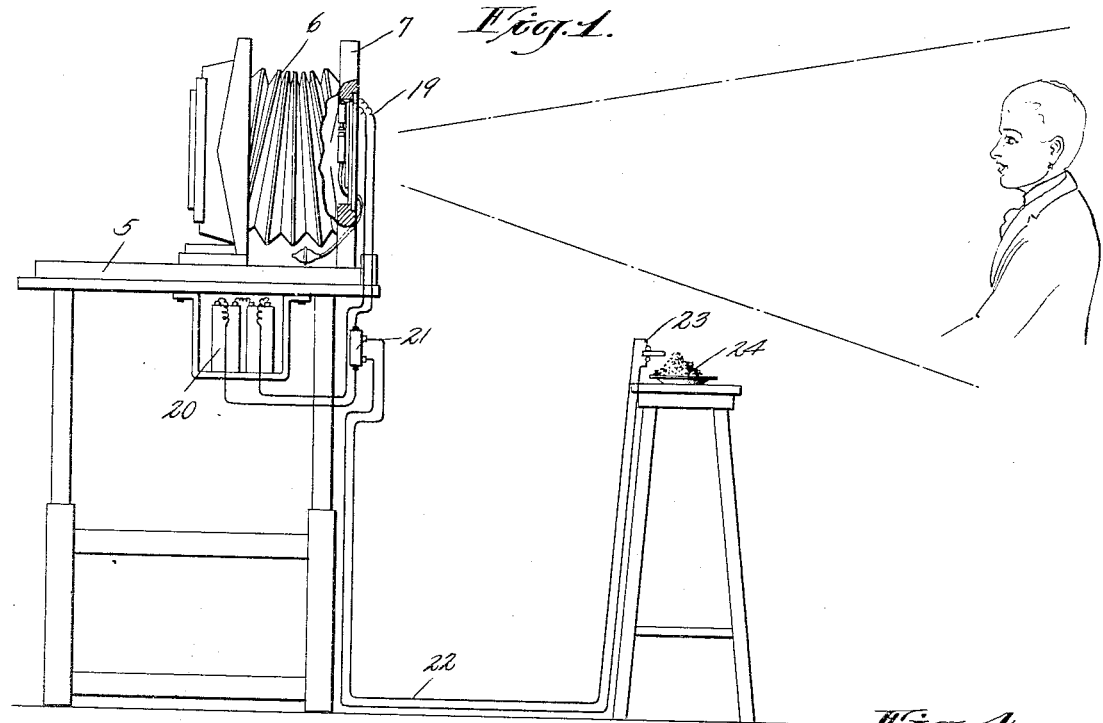
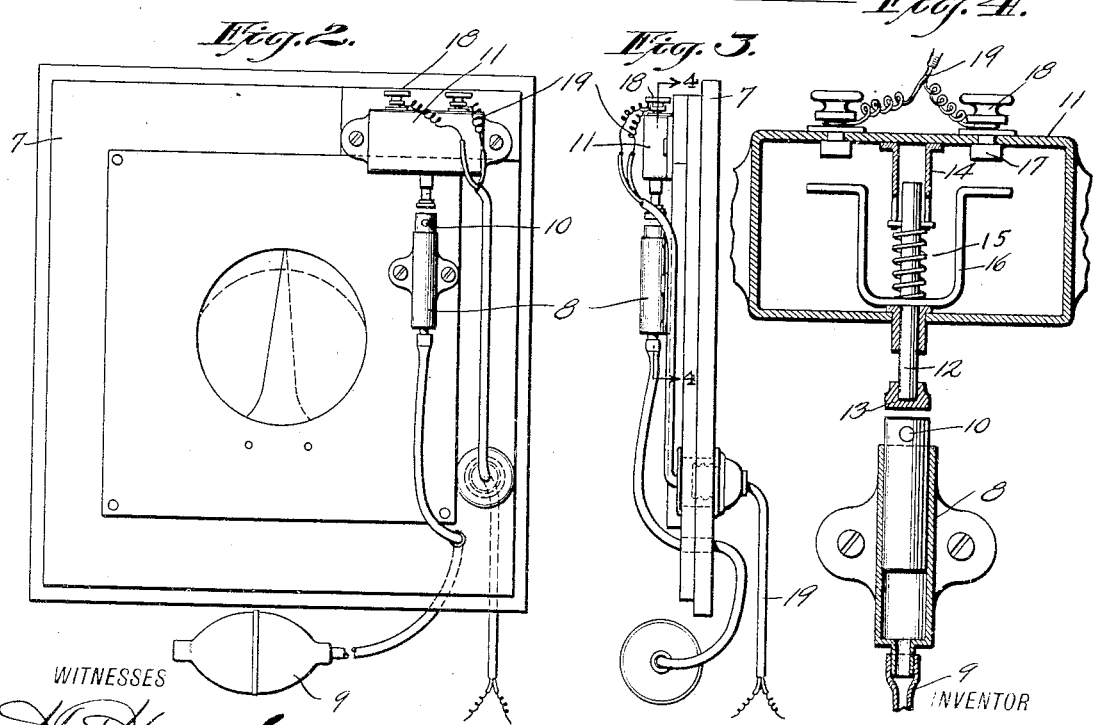
WITNESSES
INVENTOR
Egildo Pieri.
BY
ATTORNEYS

UNITED STATES PATENT OFFICE.

EGILDO PIERI, OF NEW YORK, N. Y.

CAMERA ATTACHMENT.

1,354,999.

Specification of Letters Patent.

Patented Oct. 5, 1920.

Application filed April 10, 1920. Serial No. 372,780.

*To all whom it may concern:*

Be it known that I, EGILDO PIERI, a subject of the King of Italy, and resident of the city of New York, borough of Manhattan, county and State of New York, have invented a new and Improved Camera Attachment, of which the following is a full, clear, and exact description.

In connection with the making of flash light pictures, it has been customary to insert the sensitized element, such as a plate, to position the object to be photographed in advance of the lens, to open the shutter, and to explode a charge of flashlight powder.

In this procedure, the sensitized element has usually become slightly fogged in view of the fact that a certain amount of light acted upon the plate, prior and subsequent to the explosion of the flash-powder, which was sufficient to impair the perfection of the finished picture, which was however insufficient from which to photograph the object.

To overcome this defect, photographers have often endeavored to explode the charge and open the shutter simultaneously, but this has been unsatisfactory, due to the fact that the operator was incapable of actuating the shutter at that instant during which the powder was being consumed.

I have constructed a camera attachment by means of which a flash and operation of the shutter may be synchronized mechanically upon the camera being operated.

Reference is had to the attached sheet of drawings representing one practical embodiment of my invention, and in which drawings, Figure 1 is a side view of a camera outfit with my attachment in applied position.

Fig. 2 is a front view of the shutter and lens block, with my attachment applied thereto.

Fig. 3 is a side view of the device as illustrated in Fig. 2, and

Fig. 4 is an enlarged sectional front view taken along the lines 4—4 of Fig. 3.

In these views the reference numeral 5 indicates any suitable supporting medium for the camera 6, provided with the usual lens and shutter block 7, and an actuator for the shutter 8, which actuator is operated by any suitable means such as Bowden wires, or a bulb 9.

The actuator is constructed in the conventional manner, and is provided with the usual pin or other mechanism 10, by means of which the actuator controls the operation of the shutter.

My improved attachment now conveniently includes a casing 11, mounted upon the shutter block 7, and preferably at a point directly above the actuator 8. The plunger 12 is provided with a head 13 adapted to coact with the actuator 8, and is slidably mounted in the casing 11, and this plunger conveniently has its inner end extending into any suitable guide socket 14, a spring 15 insuring that the plunger normally occupies the projected position indicated in Fig. 4.

The plunger 12 also conveniently mounts a switch member 16 adapted to bear against contact points 17 forming the inner ends of terminals 18 associated with the casing 11, which terminals are conveniently connected by means of wires 19 to any suitable source of energy 20, a supporting coil such as 21 being interposed in this circuit.

The spark coil is provided with the conventional terminals to which one end of wires 22 are attached, these wires being connected at their opposite ends with any suitable type of spark producing element 23, which overlies a pan of flash-powder 24.

It will now be appreciated that upon the bulb 9 being operated, that the actuator 8 will operate the shutter in the usual manner, by virtue of the pin 10. The actuator will further bear against the head 13 of the plunger 12, and cause a retraction of the same within the casing 11 against the action of the spring 15.

The switch member 16 will now bridge the contact points 17 and close the circuit through the spark plug 21, which will produce in the usual manner, a spark upon the part of the element 23. This will result in ignition of the flash-powder, and it will be perceived that by my improved construction, it is possible to produce a synchronous operation of the shutter and ignition of the flash-powder.

Obviously numerous modifications of structure might be resorted to without in the least departing from the scope of my claims.

I claim;

1. A camera attachment, including in combination with a camera and shutter actuator therefor, a switch including a pair of contact points, a bridging element for said contact points, means rigidly connected to said bridging element, and being adapted to normally hold the same spaced from said contact points, said contact points being in circuit with a spark producing element, said contact bridging element being adapted to overlie said actuator, whereby upon the actuator being operated, the circuit will be closed and a spark produced.

2. In combination with a camera and the shutter actuator therefor, of a casing positioned upon said actuator, a slidable plunger mounted within said casing and overlying said actuator, contact points forming a part of said casing, a bridging element rigidly connected to said plunger and being normally spaced from said contact points, a circuit, a source of energy interposed in said circuit, a spark coil also interposed in said circuit, the ends of said circuit being connected to said contact points, a circuit extending from said spark coil, a spark producing element connected to said latter circuit, whereby upon the actuator being operated, the space between the contact points will be bridged, and a spark produced simultaneously with the operation of the camera shutter.

3. A camera attachment, including in combination with a camera and shutter actuator therefor, a switch comprising a pair of contact points, a bridging element for said contact points, a slidable plunger having one of its ends overlying said actuator, a guide socket, the opposite end of said plunger projecting into said guide socket, a spring encircling said plunger and bearing against the same and outer edge of said socket, said bridging element being secured to said plunger, said contact points being in circuit with a spark producing element whereby upon said actuator being operated to move said plunger against the action of the spring, the circuit will be closed and a spark produced.

EGILDO PIERI.